United States Patent
Subbiah et al.

(10) Patent No.: US 10,938,749 B2
(45) Date of Patent: Mar. 2, 2021

(54) FABRIC MAINTENANCE IN VNODE_PORT-BASED MULTI-VIRTUAL FABRIC (VFABRIC) ENVIRONMENT

(71) Applicant: DELL PRODUCTS L.P., Round Rock, TX (US)

(72) Inventors: Ramesh Kumar Subbiah, Chennai (IN); Vibin Varghese, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 215 days.

(21) Appl. No.: 16/367,176

(22) Filed: Mar. 27, 2019

(65) Prior Publication Data
US 2020/0314032 A1 Oct. 1, 2020

(51) Int. Cl.
| | |
|---|---|
| H04L 12/939 | (2013.01) |
| H04L 12/931 | (2013.01) |
| H04L 12/24 | (2006.01) |
| H04L 12/66 | (2006.01) |
| H04L 12/935 | (2013.01) |

(52) U.S. Cl.
CPC ........... H04L 49/552 (2013.01); H04L 12/66 (2013.01); H04L 41/0816 (2013.01); H04L 49/30 (2013.01); H04L 49/70 (2013.01)

(58) Field of Classification Search
CPC ....... H04L 49/30; H04L 49/70; H04L 49/552; H04L 12/66; H04L 41/0816
See application file for complete search history.

(56) References Cited

U.S. PATENT DOCUMENTS

| | | |
|---|---|---|
| 8,036,229 B2 | 10/2011 | Banerjee |
| 8,228,820 B2 | 7/2012 | Gopal Gowda |
| 2009/0092141 A1 | 4/2009 | Banerjee |
| 2009/0274162 A1 | 11/2009 | Gopal Gowda |
| 2011/0064086 A1 | 3/2011 | Xiong |
| 2012/0163376 A1 | 6/2012 | Shukla |
| 2012/0275301 A1 | 11/2012 | Xiong |
| 2013/0163591 A1 | 6/2013 | Shukla |

(Continued)

OTHER PUBLICATIONS

Non-Final Office Action dated Dec. 3, 2019, in U.S. Appl. No. 16/367,156 (21 pgs).

(Continued)

*Primary Examiner* — Kodzovi Acolatse
*Assistant Examiner* — Farhad Ali
(74) *Attorney, Agent, or Firm* — North Weber & Baugh LLP

(57) ABSTRACT

Embodiments of the present disclosure include systems and methods for performing maintenance of a virtual fabric in a fibre channel (FC) network. In one or more embodiments, the system includes a gateway that receives a maintenance notice of a vfabric from a FC switch, the vfabric including at least one VN port session. In one or more embodiments, the gateway receives a logout notice of the at least one VN port session from the FC switch, and sends a first notice to an application, the first notice causing the application to stop sending data to the gateway. In one or more embodiments, the gateway receives a second notice that the maintenance is completed from the FC switch, re-logins the at least one VN port session into the vfabric, and sends a third notice to the application to resume sending data to the gateway.

20 Claims, 6 Drawing Sheets

(56) References Cited

U.S. PATENT DOCUMENTS

| 2014/0092912 A1* | 4/2014 | Hathorn | H04L 49/351 |
| | | | 370/401 |
| 2014/0269745 A1 | 9/2014 | Johnson | |
| 2015/0138956 A1* | 5/2015 | Hathorn | H04L 49/357 |
| | | | 370/227 |
| 2015/0333967 A1 | 11/2015 | Addanki | |

OTHER PUBLICATIONS

Response filed Apr. 3, 2020, in related U.S. Appl. No. 16/367,156 (11 pgs).
Non-Final Office Action dated Dec. 3, 2019, in U.S. Appl. No. 14/802,847 (21 pgs).
Notice of Allowance and Fee(s) Due, dated Apr. 10, 2020, in U.S. Appl. No. 16/367,156 (11 pgs).

* cited by examiner

Table 4

| Vfabric Va NS entries |
|---|
| WWN-N1-Va |
| WWN-1A |
| WWN-2B |

| Vfabric Vb NS entries |
|---|
| WWN-N1-Vb |
| WWN-1B |
| WWN-2A |

| Vfabric Vc NS entries |
|---|
| WWN-N1-Vc |
| WWN-1C |
| WWN-2C |

Table 3

| Tagging Enabled vfabric | VF ID |
|---|---|
| vfabric Va | VF-ID1 |
| vfabric Vb | VF-ID2 |
| vfabric Vc | VF-ID3 |

Table 2

| Vfabric Va members |
|---|
| WWN: WWN-1A |
| WWN: WWN-2B |

| Vfabric Vb members |
|---|
| WWN: WWN-1B |
| WWN: WWN-2A |

| Vfabric Vc members |
|---|
| WWN: WWN-1C |
| WWN: WWN-2C |

Table 1-1

| HST1 WWNs | Login Type |
|---|---|
| WWN-1A | FLOGI |
| WWN-1B | FDISC |
| WWN-1C | FDISC |

Table 1-2

| HST2 WWNs | Login Type |
|---|---|
| WWN-2A | FLOGI |
| WWN-2B | FDISC |
| WWN-2C | FDISC |

| WWN | FCID | Parent FLOGI | LOGO received |
|---|---|---|---|
| WWN-1A | FCID-1A | Yes | No |
| WWN-2B | FCID-2B | No | No |

| WWN | FCID | Parent FLOGI | LOGO received |
|---|---|---|---|
| WWN-1A | FCID-1A | Yes | Yes |
| WWN-2B | FCID-2B | No | Yes |

FIG. 4

FABRIC MAINTENANCE IN VNODE_PORT-BASED MULTI-VIRTUAL FABRIC (VFABRIC) ENVIRONMENT

CROSS-REFERENCE TO PRIOR APPLICATIONS

This patent application relates to co-pending and commonly-owned U.S. patent application Ser. No. 16/367,156, filed on Mar. 27, 2019, entitled "Virtual Node Port Virtual Fabric Support", which patent document is incorporated by reference herein in its entirety and for all purposes.

A. Technical Field

The present invention relates to information handling systems; more particularly, to systems and methods for performing a maintenance activity of a virtual fabric (vfabric) without impacting other vfabrics in a fibre channel (FC) network.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the conventional FC network systems, a server communicates data with FC storage devices through multiple virtual fabrics (vfabrics). Typically, multiple applications run on a server that has one or more physical interface ports (or equivalently enodes). In general, an application running on the server logs into a vfabric as a fabric login (FLOGI), and the other applications running on the server log into other vfabics as fabric discovery (FDISC) logins (or shortly FDISCs) that depend on the parent FLOGI, where a virtual node_port (VN port) is created for each login.

Since these VN port logins (FLOGI and FDISCs) are sprayed across different vfabrics, the operational status of the VN port session of FLOGI may affect other VN port sessions that correspond to the same N_port ID virtualization (NPIV/FDICSs). The NPIV/FDISCs that are dependent on the parent FLOGI are cleared when the parent FLOGI is cleared.

During the maintenance phase of a vfabric, a user of the server may expect that only the vfabric under the maintenance/debugging phase is shut down while the other vfabrics are up and running without interruption. However, currently, there is no mechanism that causes the FC switch to inform the N_port ID virtualization (NPIV) gateway (NPG) of the maintenance so that the NPG can make sure that the FDISCs logged into other vfabrics are not affected. Thus, there is a need for systems and method that allows a maintenance activity of a vfabric without impacting other vfabrics in a FC network.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 1 depicts a schematic diagram of a network according to embodiments of the present disclosure.

FIGS. 3 and 4 depict tables that indicate the logout status of VN port logins according to embodiments of the present disclosure.

DETAILED DESCRIPTION OF THE PREFERRED EMBODIMENTS

Figure 2:
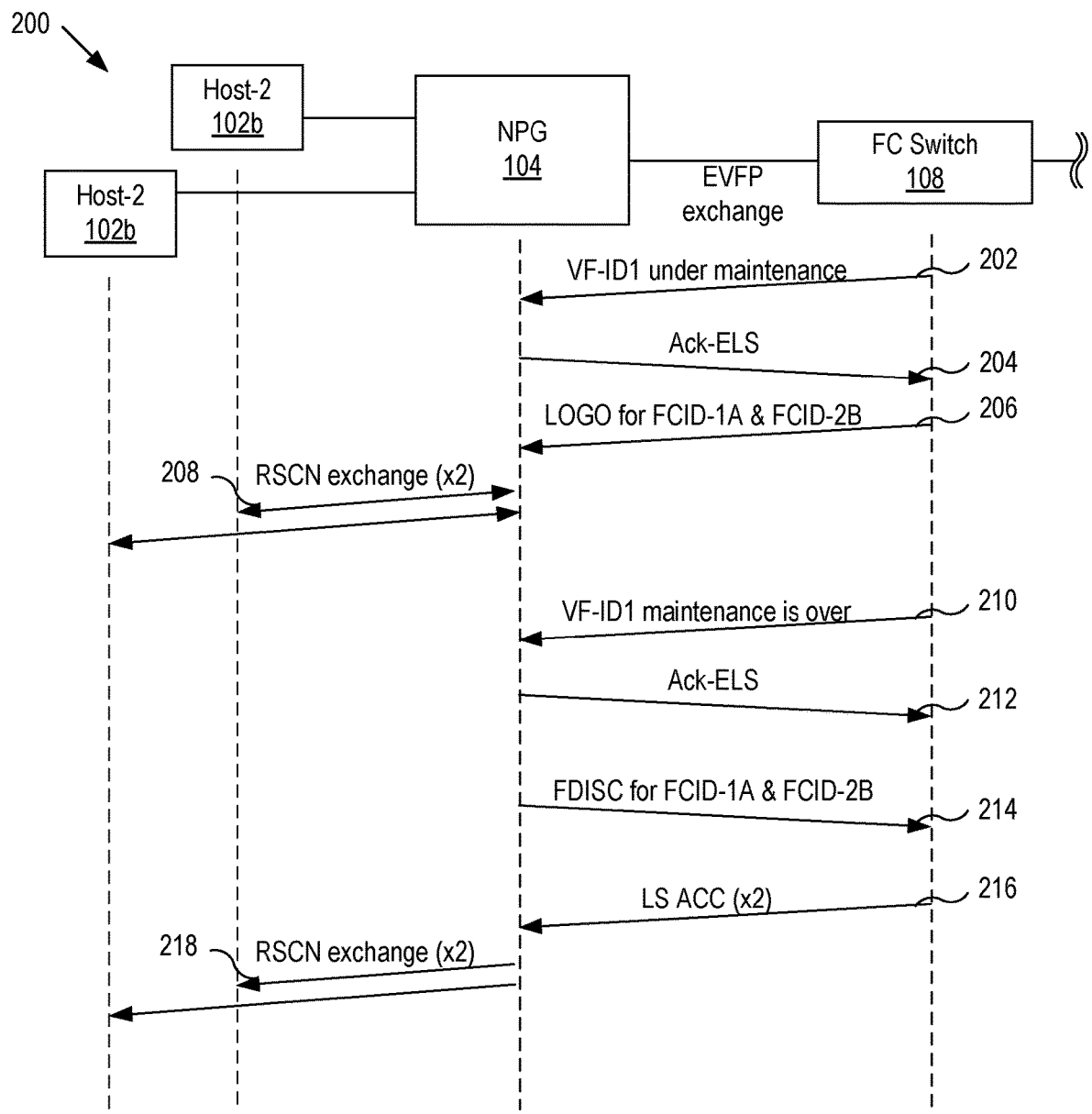
FIG. 2 depicts a flowchart of an exemplary data flow in the network according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

FIG. 1 shows a schematic diagram of network 100 supporting multiple vfabrics according to embodiments of the present disclosure. Hereinafter, the term vfabric refers to a virtual network topology in which components pass data to each other. As depicted, the network includes: a FC forwarder device, such as an N_port ID virtualization (NPIV) gateway (NPG), 104; host-1 102a and host-2 102b having physical ports 103a and 103b, respectively, and connected to the N_port ID virtualization (NPIV) gateway (NPG) 104 through two physical fabric ports F1 105a and F2 105b, respectively; an FC switch 108 having a first port 109 connected to a proxy node_port N1 107 of NPG and a second port 110 connected to the network 112, such as the Internet; and one or more storage devices 114a-114n coupled to the network 112. In embodiments, the storage devices 114a-114n may be directly coupled to the FC switch 108. In embodiments, each of the storage devices 114a-114n may be provided by a FC storage area network (SAN) and configured to receive FC communications originated from the hosts 102a and 102b through the FC switch 108, send FC communications to the hosts through the FC switch, and/or perform other FC storage system functionality that would be apparent to those of ordinary skill in the art. For the purpose of illustration, the NPG 104 is assumed to be the FC forwarder device 104, even though other types of forwarding device may be used in place of NPG.

In embodiments, each host (e.g. 102a) may be a server. For brevity, only two hosts are shown in FIG. 1. However, one of skill in the art in possession of the present disclosure will recognize that any other suitable number of hosts may be connected to the NPG 104. Also, it should be apparent to those of ordinary skill in the art that the host-1 102a (and host-2 102b) may have multiple physical ports, such as converged network adaptors (CNAs) or host bus adaptors (HBAs), that are configured to provide fibre-channel-on-Ethernet (FCoE) communications between the NPG 104 and the hosts 102a and 102b. In embodiments, each physical port of the hosts may be coupled to a physical fabric port of the NPG 104 by a cable (e.g., an optical cable, a copper wire cable, and/or other cabling) and/or other coupling system that would be apparent to those of ordinary skill in the art.

In embodiments, the NPG 104 may be provided by a switch or other networking device that is configured to receive Ethernet communications from the hosts 102a and 102b, convert those Ethernet communications to FC communications for forwarding to the FC switch 108, receive FC communications from the FC switch 108, convert those FC communications to Ethernet communications for forwarding to the hosts 102a and 102b. In embodiments, the NPG 104 may allow the VN ports 111a-111c created in the hosts 102a and 102b be segregated into different vfabrics.

For the purpose of illustration, it is assumed that the FC configuration in the system 100 includes only three virtual fabrics (vfabrics) Va, Vb and Vc, even though other suitable number of vfabrics may be supported by the system 100. In embodiments, during the initial handshake stage, the NPG 104 and FC switch 108 may exchange exchange-virtual-fabric-parameters (EVFPs) to each other, and assign a virtual fabric ID (VF ID) to each vfabric of the system 100. Table 3 in the FIG. 1 shows the three vfabrics Va, Vb and Vc and the corresponding identifications (VF IDs). In embodiments, Table 3 may be stored in both NPG 104 and FC switch 108, where NPG and FC switch may use the VF IDs to tag the data frames exchanged between the FC switch 108 and the hosts 102a and 102b, to thereby identify each data frame as part of the corresponding vfabric.

In embodiments, the proxy node_port (shortly NP port) N1 107 of NPG 104 may log into each of the vfabrics Va, Vb, and Vc. For instance, the login name of N1 107 for the vfabric Va may be WWN-N1-Va, as shown in Table 4 in FIG. 1. (Here, the term WWN refers to world-wide-name.) In embodiments, this login may be a FLOGI and proxy the subsequent logins (i.e., the logins of WWN-1A and WWN-2B into the vfabric Va, as shown in Table 4 in FIG. 1) from the hosts 102a and 102b, i.e., the subsequent logins of the hosts 102a and 102b into the vfabric Va may depend on the parent login WWN-N1-Va. Similarly, the proxy node port N1 107 of NPG 104 may log into the vfabric Vb, creating a login name WWN-N1-Vb, as shown in Table 4. From the standpoint of the FC switch 108, the N1 107 may be the proxy port of the two hosts 102a and 102b.

After the initial EVFP exchanges between the NPG 104 and FC switch 108, the applications of the hosts 102a and 102b may log into the vfabrics. For the purpose of illustration, it is assumed that three applications running on the host-1 102a may log into the three vfabrics, even though other suitable number of applications may run on the host-1 102 and log into other suitable number of vfabrics. In embodiments, each application running on the host-1 102a may attempt to log into a vfabric, and if the WWN of the login matches with anyone of the vfabric list, the login may be allowed and tagged with the VF ID of the vfabric. By way of example, three VN port logins (or shortly logins), WWN-1A, WWN-1B, and WWN-1C, may correspond to the three vfabrics, Va, Vb, and Vc, respectively, as shown in Tables 1-1 in FIG. 1.

In embodiments, each login of the applications may create a virtual node (VN) port, i.e., each application may be associated with a VN port and a login name for a vfabric. Then, each application may start communication through the corresponding VN port and vfabric during the VN port session. By way of example, the first login of the host-1 102a may have the login name WWN-1A and be a FLOGI, where the subsequent logins may have the login names WWN-1B and WWN-1C and be FDISCs, as shown in Table 1-1 in FIG. 1. In embodiments, the FDISCs depend on the parent FLOGI.

In Table 4, each vfabric has a name server list that includes one or more entries. The first entry in each list, such as WWN-N1-Vb, is a FLOGI while the following entries are FDISCS. In embodiments, as discussed above, the WWN-1A of the host-1 102a may log into the vfabric Va as a FLOGI, but NPG 104 may later change the type into FDISC before entering the login WWN-1A into the name server list in Table 4.

In embodiments, a VN port (e.g. 111a) (and a VN port session) may be created for each login. By way of example, there are three logins running on the host-1 102a and, as such, three VN ports 111a-111c may be created, where these VN ports share the same physical port F1 105a. In embodiments, from the standpoint of the NPG 104, WWN-1A may be the parent login of all the logins that share the physical port 103a. As such, in embodiments, the first login, WWN-1A, may be a FLOGI, while the other logins may be FDISCs. In the host-1 102a, the three FDISCs depend from the parent FLOGI.

In embodiments, the applications running on the host-2 102b may log into three vfabrics in the same manner as the host-1 102a. Table 1-2 shows the WWNs of the three logins of the host-2 102b and the corresponding login types. For the purpose illustration, only three logins are shown in Table 1-2, even though other suitable number of applications may run and log into vfabrics. In embodiments, the logins of host-2 102b may belong to different NS entries of the vfabrics Va, Vb, and Vc, respectively, as shown in Table 4, and tagged to the corresponding VF ID. In embodiments, from the standpoint of the NPG 104, WWN-2A may be the parent login of all the logins that share the physical port 105a. As such, in embodiments, the first login, WWN-2A, may be a FLOGI, while the other logins may be FDISCs.

In embodiments, in the NPG 104, each vfabric may be created with members being either WWNs or interfaces. For instance, WWN-1A, WWN-1B and WWN-1C may be members of the vfabrics Va, Vb, and Vc, respectively, as shown in Table 2 in FIG. 1. Similarly, WWN-2A, WWN-2B and WWN-2C may be members of the vfabrics Va, Vb, and Vc, respectively, as shown in Table 2 in FIG. 1. It is noted that the fabric port F1 105a (or F2 105b) may not be configured for a particular vfabric. As such, the data communicated through the physical port (interface) 103a (or 103b) may belong to multiple vfabrics. Stated differently, the three VN ports 111a-111c (or the VN ports in the host-2 102b) created by the three logins of the host-1 102a (or host-2 102b) may share the common physical port 103a (or 103b), while the VN ports (and the logins) may be parts of different vfabrics. In embodiments, the applications (and VN ports) running on the host-1 102a (or host-2 102b) may be segregated to different vfabrics on the single physical port 105a (or port 105b).

FIG. 2 shows a flowchart 200 of an exemplary data flow in the network according to embodiments of the present disclosure. In embodiments, the FC switch 108 may send a maintenance notice 202 to the NPG 104 to inform that a particular vfabric (e.g. Va) is configured for maintenance. In embodiments, the maintenance notice 202 may be an extended link service (ELS) command or a modified EVFP, and include the VF ID (such as VFID-1) of the vfabric. In embodiments, the NPG 104 may move the vfabric Va into the maintenance phase.

In response to the notice 202, the NPG 104 may send an acknowledgement 204, such as an ack-ELS command, to the FC switch 108. In embodiments, the NPG 104 may maintain a table that shows the logout status of each host login (or VN port session). FIG. 3 shows a table 300 that indicates the logout status of VN port sessions (or equivalently host logins) in the vfabric Va according to embodiments of the present disclosure. As depicted, each row in the Table 300 shows the WWN of a host login, fibre channel identification (FCID) of the host login, information on whether the host login is a parent login, and information on whether the logout notice (LOGO) of the host login (or VN port session) is received. In the current example, the Table 300 indicates: two host logins (VN port sessions), WWN-1A and WWN-2B, are logged into the vfabric Va; WWN-1A is the only parent login (FLOGI); and none of the host logins have not received the LOGO yet.

In embodiments, the FC switch 108 may send a LOGO 206 for each NS member of the vfabric Va to the NPG 104, indicating that the VN port sessions are logged out. Then, the NPG 104 may update the Table 300. FIG. 4 shows a table 400 that indicates the logout status of VN port logins (or equivalently VN port sessions) in the vfabric Va according to embodiments of the present disclosure. As depicted, the Table 300 may be updated into the Table 400, indicating the two VN port session are logged out.

In embodiments, upon receiving the LOGO 206, the NPG 104 may send one or more registered-state-change-notifications (RSCNs) 208 to one or more applications that correspond to the one or more parent FLOGIs in the Table 400. In the vfabric Va, there is only one parent FLOGI, i.e., WWN-1A, in the Table 400 and, as such, the NPG 104 may send the RSCN 208 to the VN port 111a (or application) in the host-1 102a.

In embodiments, the NPG 104 may also send a RSCN to each FDISC member in the vfabric Va. In the Table 400, the NPG 104 may send a RSCN to an application corresponding to the WWN-2B (or a VN port that corresponds to WWN-2B). Upon receiving the RSCN, the application corresponding to WWN-2B may stop sending data packets to the NPG 104.

In conventional systems, a FDISC login (and the corresponding application) may not know that the vfabric is under maintenance since the NPG may not send any maintenance notice. Then, the corresponding application may repeatedly try to send one or more login frames to the NPG and, after a few retries, the FDISC retires may get timed out. In such a case, a manual intervention, such as link reset, may be needed. Unlike the conventional systems, the NPG 104 may send the RSCN 208 to the applications, obviating the manual intervention.

In embodiments, the RSCN 208 may include four data fields: (the address of the vfabric under maintenance;

domain; area; port). In the current example, (the address of the vfabric Va; 0; 0; 0) may be filled in the data fields of the RSCN 208.

Upon completion of the maintenance activity, the FC switch 108 may send a notice 210 to the NPG 104, informing that the maintenance activity is over. In response, the NPG 104 may send an acknowledgment 212, such as ack-ELS, to the FC switch 108. Also, the NPG 104 may re-login the VN port sessions, which were previously logged out, into the vfabric Va. It is noted that the NPG 104 convert the WWN-1A, which is a FLOGI in the Table 1-1 in FIG. 1, into a FDISC login before the NPG 104 re-logins the VN port session of WWN-1A into the vfabric Va.

Upon re-logging the two VN port sessions into the vfabric Va, the FC switch 108 may send a login success notice (LS ACC) 216 for each re-logged FDISC. Then, the NPG 104 may send the RSCNs 218 to the application, notifying that the maintenance process is completed and allowing the application to resume sending data packets. If the re-login is not successful, the NPG 104 may send a LOGO to each application.

Figure 5:
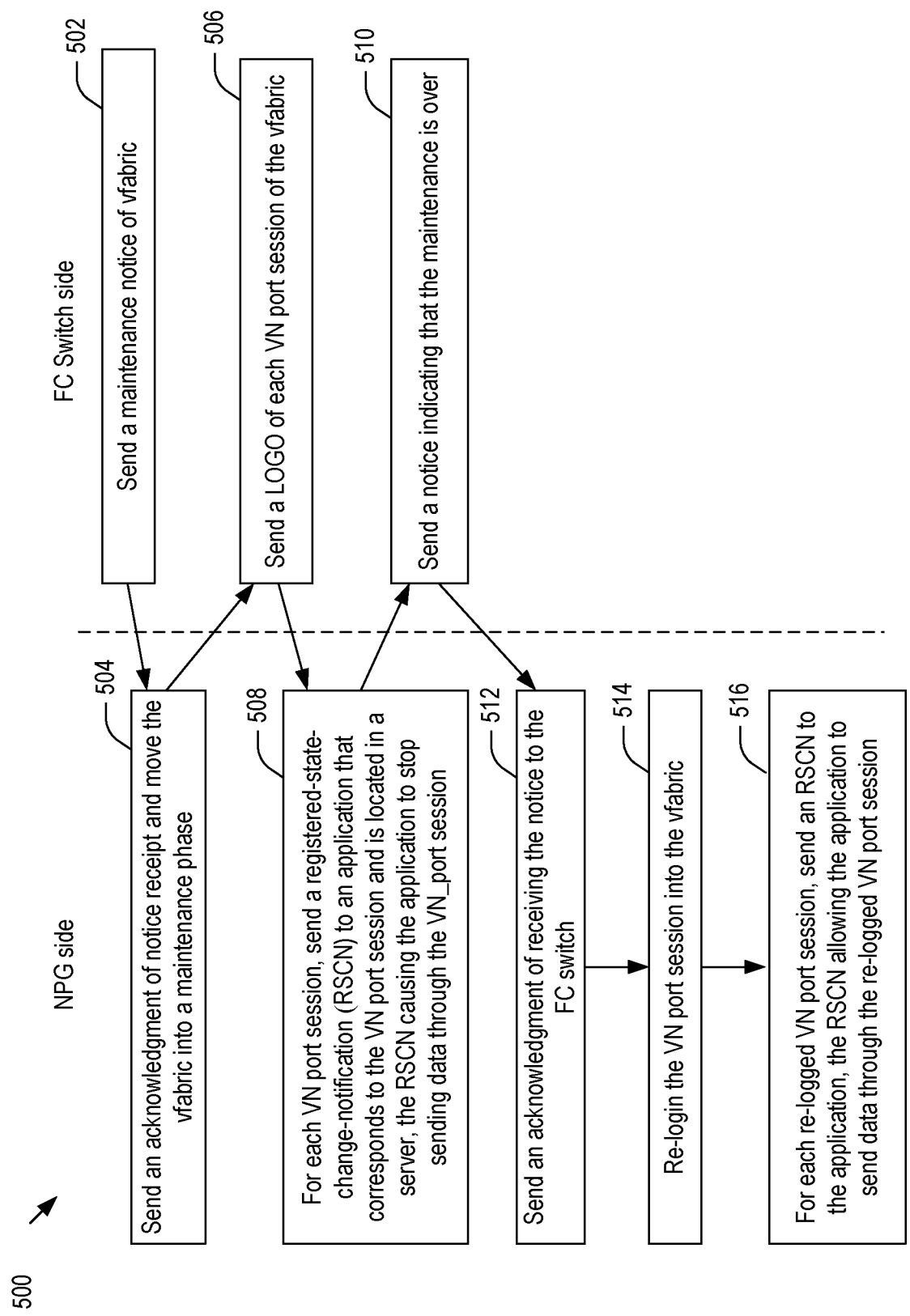
FIG. 5 depicts a flowchart of an illustrative process for performing a maintenance activity according to embodiments of the present disclosure.

FIG. 5 shows a flowchart 500 of an illustrative process for performing a maintenance activity according to embodiments of the present disclosure. At step 502, the FC switch 108 may send a maintenance notice 202 of a vfabric (e.g. Va) to the NPG 104. Then, at step 504, the NPG 104 may receive the maintenance notice 202 and, in response, send an acknowledgment notice ACK-ELS 204 to the FC switch 108. Also, in embodiments, the NPG 104 may move the vfabric Va into the maintenance phase.

At step 506, the FC switch 108 may send a logout notice (LOGO) 206 of VN port session to the NPG 104. Then, at step 508, the NPG 104 may send a RSCN 208 to each application (or VN port) in the server that hosts application, where the VN port corresponds to the host login. In embodiments, the RSCN may be sent to each application that is logged into the vfabric as a patent FLOGI login. In alternative embodiments, the RSCN may be sent to each and every application that is logged into the vfabric as either FLOGI or FDISC. In embodiments, upon receiving the RSCN, the application of the host login may stop sending data packets through the VN port session to the NPG 104.

At step 510, the FC switch 108 may send a notice 210 indicating that the maintenance is over. Upon receiving the notice, the NPG 104 may send an acknowledgment notice AC-ELS 212 to the FC switch 108 at step 512. At step 514, the NPG 104 may re-login the VN port sessions that have been logged out during the maintenance. At step 516, the NPG 104 may send an RSCN to each application that corresponds to the re-logged VN port session. Upon receiving the RSCN, the application may send data to the NPG 104 through the re-logged VN port session.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
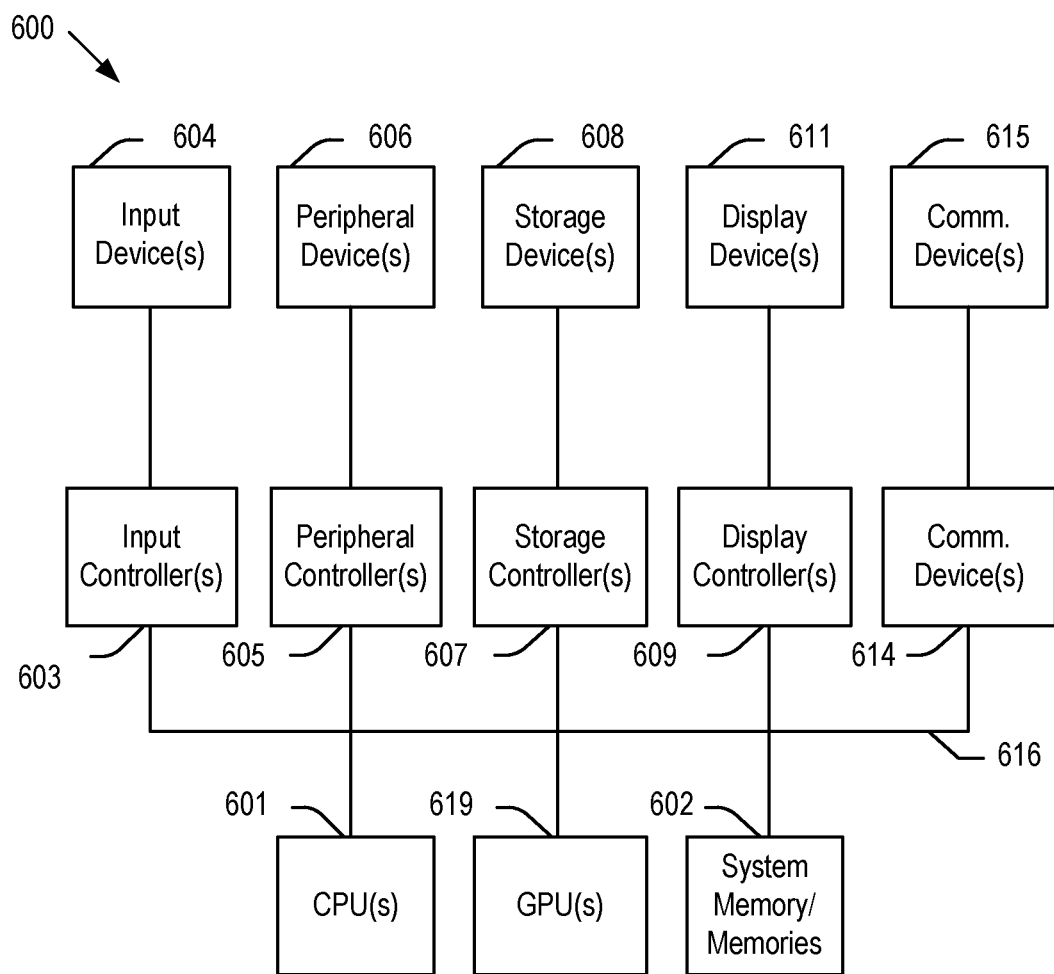
FIG. 6 depicts a simplified block diagram of an information handling system according to embodiments of the present invention.

FIG. 6 depicts a simplified block diagram of an information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 7:
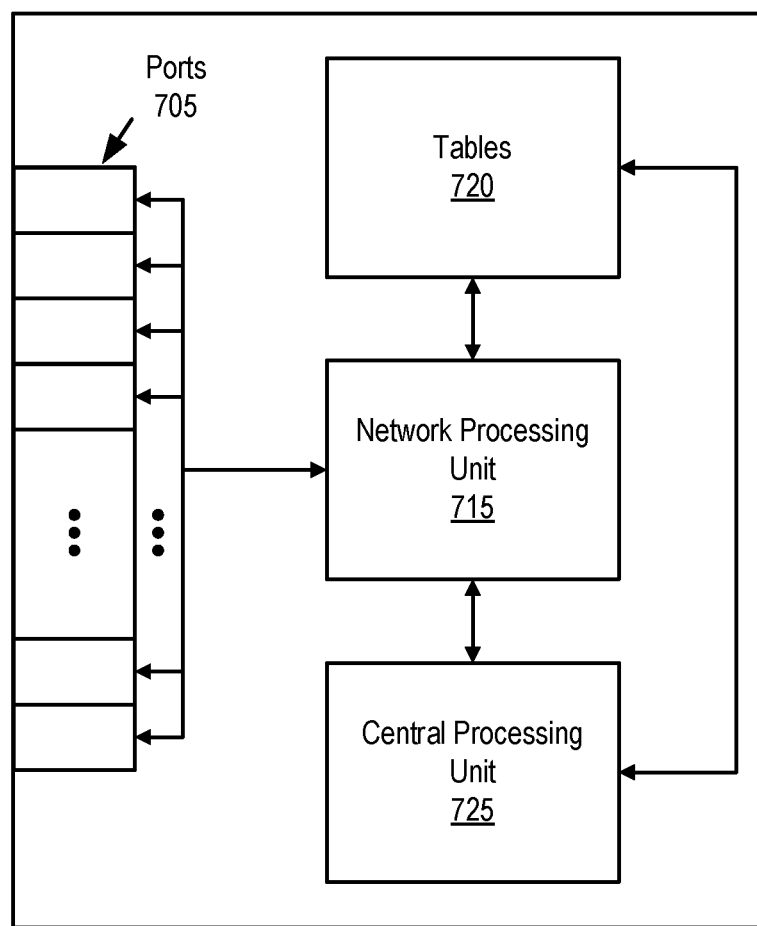
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components (including fewer or more components).

The information handling system 700 may include a plurality of I/O ports 705, a network processing unit (NPU) 715, one or more tables 720, and a central processing unit (CPU) 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An information handling system, comprising:
a plurality of ports;
one or more processing units communicatively coupled to the plurality of ports; and
a non-transitory computer-readable medium or media comprising one or more sequences of instructions which, when executed by at least one of the one or more processors, causes steps to be performed comprising:
receiving a maintenance notice of a virtual fabric (vfabric) from a fibre channel (FC) switch, the vfabric including at least one virtual node (VN) port session;
receiving a logout notice of the at least one VN port session from the FC switch;
sending a first notice to at least one application that corresponds to the at least one VN port session and is located in a server, the first notice causing the at least one application to stop sending data through the at least one VN port session;
receiving a second notice that the maintenance is completed from the FC switch; and
re-logging the at least one VN port session into the vfabric.

2. An information handling system as recited in claim 1, wherein the non-transitory computer-readable medium or media further comprises one or more sequences of instructions which, when executed by at least one of the one or more processors, causes steps to be performed comprising:
after the step of receiving the maintenance notice, moving the vfabric into a maintenance phase.

3. An information handling system as recited in claim 1, wherein the non-transitory computer-readable medium or media further comprises one or more sequences of instructions which, when executed by at least one of the one or more processors, causes steps to be performed comprising:
in response to the maintenance notice, sending an acknowledgment of receiving the maintenance notice to the FC switch.

4. An information handling system as recited in claim 1, wherein the non-transitory computer-readable medium or media further comprises one or more sequences of instructions which, when executed by at least one of the one or more processors, causes steps to be performed comprising:
in response to the second notice, sending an acknowledgment of receiving the second notice to the FC switch.

5. An information handling system as recited in claim 1, wherein the non-transitory computer-readable medium or media further comprises one or more sequences of instructions which, when executed by at least one of the one or more processors, causes steps to be performed comprising:
after the step of re-logging the at least one VN port session, sending a third notice to the at least one application, the third notice allowing the at least one application to send data through the at least one VN port session.

6. An information handling system as recited in claim 1, wherein the at least one VN port session includes a fabric login (FLOGI).

7. An information handling system as recited in claim 1, wherein the at least one VN port session includes a fabric login (FLOGI) and at least one fabric discovery (FDISC) login that depends from the FLOGI.

8. A computer-implemented method of performing a maintenance of a virtual fabric (vfabric) in a fibre channel (FC) network, comprising:
receiving a maintenance notice of a vfabric from a FC switch, the vfabric including at least one virtual node (VN) port session;
receiving a logout notice of the at least one VN port session from the FC switch;
sending a first notice to at least one application that corresponds to the at least one VN port session and is located in a server, the first notice causing the at least one application to stop sending data through the at least one VN port session;
receiving a second notice that the maintenance is completed from the FC switch; and
re-logging the at least one VN port session into the vfabric.

9. A computer-implemented method as recited in claim 8, further comprising, after the step of receiving the maintenance notice:
moving the vfabric into a maintenance phase.

10. A computer-implemented method as recited in claim 8, further comprising, after the step of receiving the maintenance notice:
sending an acknowledgment of receiving the maintenance notice to the FC switch.

11. A computer-implemented method as recited in claim 8, further comprising, after the step of receiving the second notice:
sending an acknowledgment of receiving the second notice to the FC switch.

12. A computer-implemented method as recited in claim 11, wherein the at least one VN port session includes a fabric login (FLOGI).

13. A computer-implemented method as recited in claim 8, further comprising, after the step of re-logging the at least one VN port session:
sending a third notice to the at least one application, the third notice allowing the at least one application to send data through the at least one VN port session.

14. A computer-implemented method as recited in claim 8, wherein the at least one VN port session includes a fabric login (FLOGI) and at least one fabric discovery (FDISC) login that depends from the FLOGI.

15. A non-transient computer-readable medium or media comprising one or more sequences of instructions which, when executed by one or more processors, causes steps to be performed comprising:
receiving a maintenance notice of a vfabric from a FC switch, the vfabric including at least one virtual node (VN) port session;
receiving a logout notice of the at least one VN port session from the FC switch;
sending a first notice to at least one application that corresponds to the at least one VN port session and is located in a server, the first notice causing the at least one application to stop sending data through the at least one VN port session;
receiving a second notice that the maintenance is completed from the FC switch; and
re-logging the at least one VN port session into the vfabric.

16. A non-transient computer-readable medium or media as recited in claim 15, further comprising one or more sequences of instructions, when executed by the one or more processors, causes steps to be performed comprising:
after the step of receiving the maintenance notice, moving the vfabric into a maintenance phase.

17. A non-transient computer-readable medium or media as recited in claim 15, further comprising one or more sequences of instructions, when executed by the one or more processors, causes steps to be performed comprising:
after the step of receiving the maintenance notice, sending an acknowledgment of receiving the maintenance notice to the FC switch.

18. A non-transient computer-readable medium or media as recited in claim 15, further comprising one or more sequences of instructions, when executed by the one or more processors, causes steps to be performed comprising:
after the step of receiving the second notice, sending an acknowledgment of receiving the second notice to the FC switch.

19. A non-transient computer-readable medium or media as recited in claim 15, wherein the at least one VN port session includes a fabric login (FLOGI).

20. A non-transient computer-readable medium or media as recited in claim 15, wherein the at least one VN port session includes a fabric login (FLOGI) and at least one fabric discovery (FDISC) login that depends from the FLOGI.

* * * * *